(12) United States Patent
Nishikawa

(10) Patent No.: US 9,988,090 B2
(45) Date of Patent: Jun. 5, 2018

(54) VEHICLE FRAME

(71) Applicant: NISSAN MOTOR LIGHT TRUCK CO., LTD., Saitama (JP)

(72) Inventor: Takemi Nishikawa, Saitama (JP)

(73) Assignee: NISSAN MOTOR LIGHT TRUCK CO., LTD. (JP)

( * ) Notice: Subject to any disclaimer, the term of this patent is extended or adjusted under 35 U.S.C. 154(b) by 0 days. days.

(21) Appl. No.: 15/444,953

(22) Filed: Feb. 28, 2017

(65) Prior Publication Data

US 2018/0022388 A1 Jan. 25, 2018

Related U.S. Application Data

(63) Continuation of application No. PCT/JP2016/071406, filed on Jul. 21, 2016.

(51) Int. Cl.
*B62D 21/06* (2006.01)
*B62D 21/15* (2006.01)
*B62D 21/02* (2006.01)

(52) U.S. Cl.
CPC .......... *B62D 21/152* (2013.01); *B62D 21/02* (2013.01); *B62D 21/06* (2013.01)

(58) Field of Classification Search
CPC ....... B62D 21/02; B62D 21/152; B62D 21/06
See application file for complete search history.

(56) References Cited

U.S. PATENT DOCUMENTS

| | | | | |
|---|---|---|---|---|
| 2,532,749 | A * | 12/1950 | Aurand | B62D 21/02 33/203 |
| 9,211,915 | B2 | 12/2015 | Abe et al. | |
| 9,802,648 | B2 * | 10/2017 | Atsumi | B62D 21/06 |
| 2005/0077756 | A1 * | 4/2005 | Matsuda | B62D 21/152 296/203.02 |
| 2007/0187994 | A1 * | 8/2007 | Yasuhara | B62D 21/06 296/203.04 |
| 2012/0256448 | A1 * | 10/2012 | Yasui | B62D 21/152 296/209 |

(Continued)

FOREIGN PATENT DOCUMENTS

| | | |
|---|---|---|
| JP | 05-008755 A | 1/1993 |
| JP | 2008230459 A | 10/2008 |

(Continued)

*Primary Examiner* — James A English
(74) *Attorney, Agent, or Firm* — Lerner, David, Littenberg, Krumholz & Mentlik, LLP

(57) ABSTRACT

A vehicle frame includes: a pair of right and left side frames; plural cross members connecting the pair of right and left side frames; and a pair of right and left push members obliquely extending forward and also toward the outside in the vehicle width direction, from right and left ends of one of the cross members in front of a cabin. The frame further includes: a pair of right and left first diagonal members obliquely extending backward from positions opposing the push members across one cross member to connect the one cross member with an intermediate portion of another cross member behind the one cross member; and a second diagonal member obliquely extending backward in V shape from a position opposing the first diagonal members across the other cross member to connect the other cross member with inner surfaces of the right and left side frames behind it.

7 Claims, 14 Drawing Sheets

(56) References Cited

U.S. PATENT DOCUMENTS

| | | | |
|---|---|---|---|
| 2012/0306234 A1* | 12/2012 | Akaki | B62D 21/02 |
| | | | 296/187.03 |
| 2015/0001894 A1* | 1/2015 | Outen | B62D 21/02 |
| | | | 296/204 |
| 2015/0251702 A1 | 9/2015 | Volz et al. | |
| 2016/0059896 A1* | 3/2016 | Gergaud | B62D 21/183 |
| | | | 296/205 |

FOREIGN PATENT DOCUMENTS

| | | |
|---|---|---|
| JP | 2015058793 A | 3/2015 |
| WO | 2015193972 A1 | 12/2015 |

\* cited by examiner

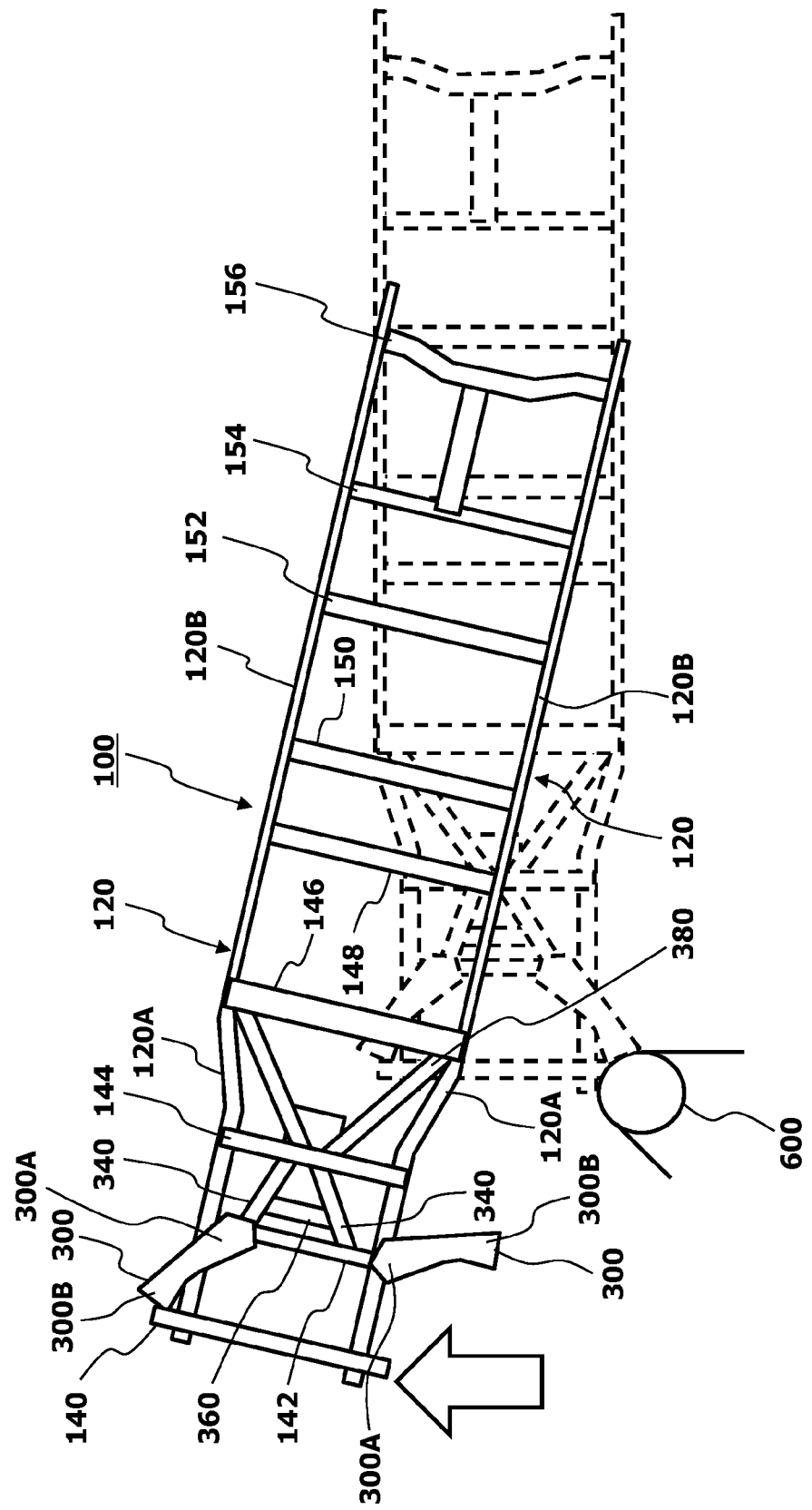

VEHICLE FRAME

CROSS-REFERENCE TO RELATED APPLICATIONS

This application is a continuation of International Application No. PCT/JP2016/071406, filed on Jul. 21, 2016, the disclosure of which is incorporated herein by reference.

FIELD OF THE INVENTION

The present invention relates to a vehicle frame for use in, e.g., a pickup truck.

BACKGROUND OF THE INVENTION

When the vehicle suffers a small overlap crash against a barrier (or an object), the barrier falls outside a shock absorbing structure in the front of the vehicle. As a result, impact energy cannot be easily controlled, and a cabin is largely deformed narrowing the seating space. To overcome such problem, the following technique is proposed, for example, in JP 2015-58793 A (Patent Document 1). That is, a projecting member having an obliquely extending front surface is attached to respective outer surfaces of side frames, by which the force (crash force) generated upon collision between the projecting member and a barrier is utilized to push the vehicle body sideways and keep the body away from the barrier.

In the technique proposed in Patent Document 1, crash force deforms the side frames and a power unit receives the crash force. With this configuration, the crash force is weakened due to the deformation of the side frames. If the crash force is weakened, the force of pushing the vehicle sideways is also weakened, and the vehicle may possibly not get away from the barrier.

SUMMARY OF THE INVENTION

An aspect of the present invention may provide a vehicle frame which ensures that the vehicle is easily kept away from a barrier in case of a small overlap crash.

A vehicle frame includes: a pair of right and left side frames extending in a front-rear direction of a vehicle; a plurality of cross members extending in a vehicle width direction to connect the pair of right and left side frames; and a pair of right and left push members which obliquely extend forward and also toward the outside in the vehicle width direction, from right and left ends of one of the cross members that is positioned in front of a cabin, and which have tip ends protruding up to the outside of the side frames in the vehicle width direction. The vehicle frame further includes: a pair of right and left first diagonal members that obliquely extend backward from positions opposing the push members across the one cross member to connect the one cross member with an intermediate portion of an other cross member positioned behind the one cross member; and a second diagonal member obliquely extending backward in a V shape from a position opposing the first diagonal members across the other cross member to connect the other cross member with inner surfaces of the right and left side frames, which are positioned behind the other cross member.

According to an aspect of the present invention, the vehicle can be easily kept away from a barrier in case of a small overlap crash.

BRIEF DESCRIPTION OF THE DRAWINGS

FIG. 14 is an explanatory view of a fourth process for moving a vehicle away from a barrier in case of a small overlap crash.

DESCRIPTION OF PREFERRED EMBODIMENTS

Embodiments for implementing the present invention will be described in detail below with reference to the accompanying drawings.

Figure 1:
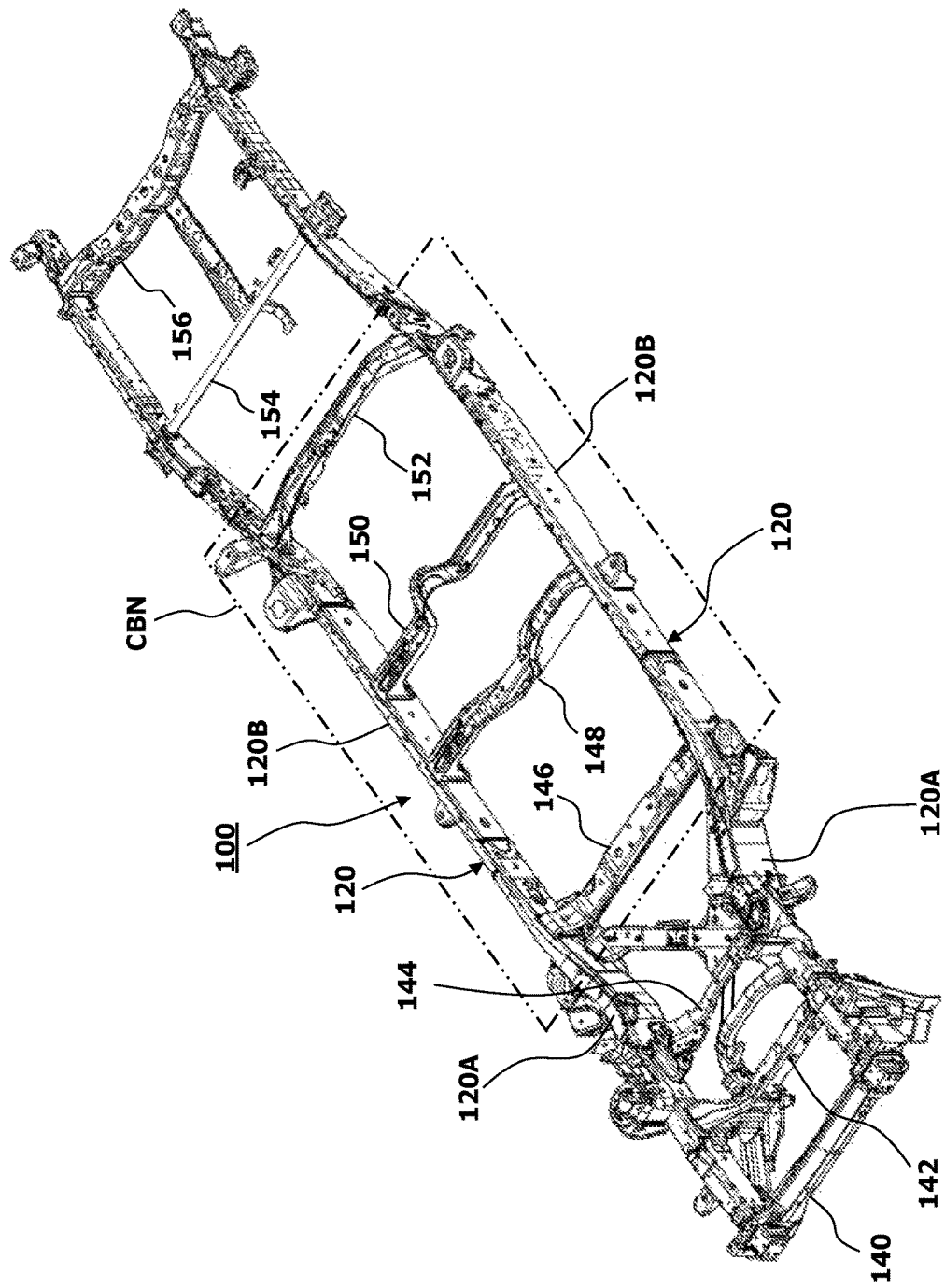
FIG. 1 is a perspective view showing an example of a vehicle frame.
Figure 2:
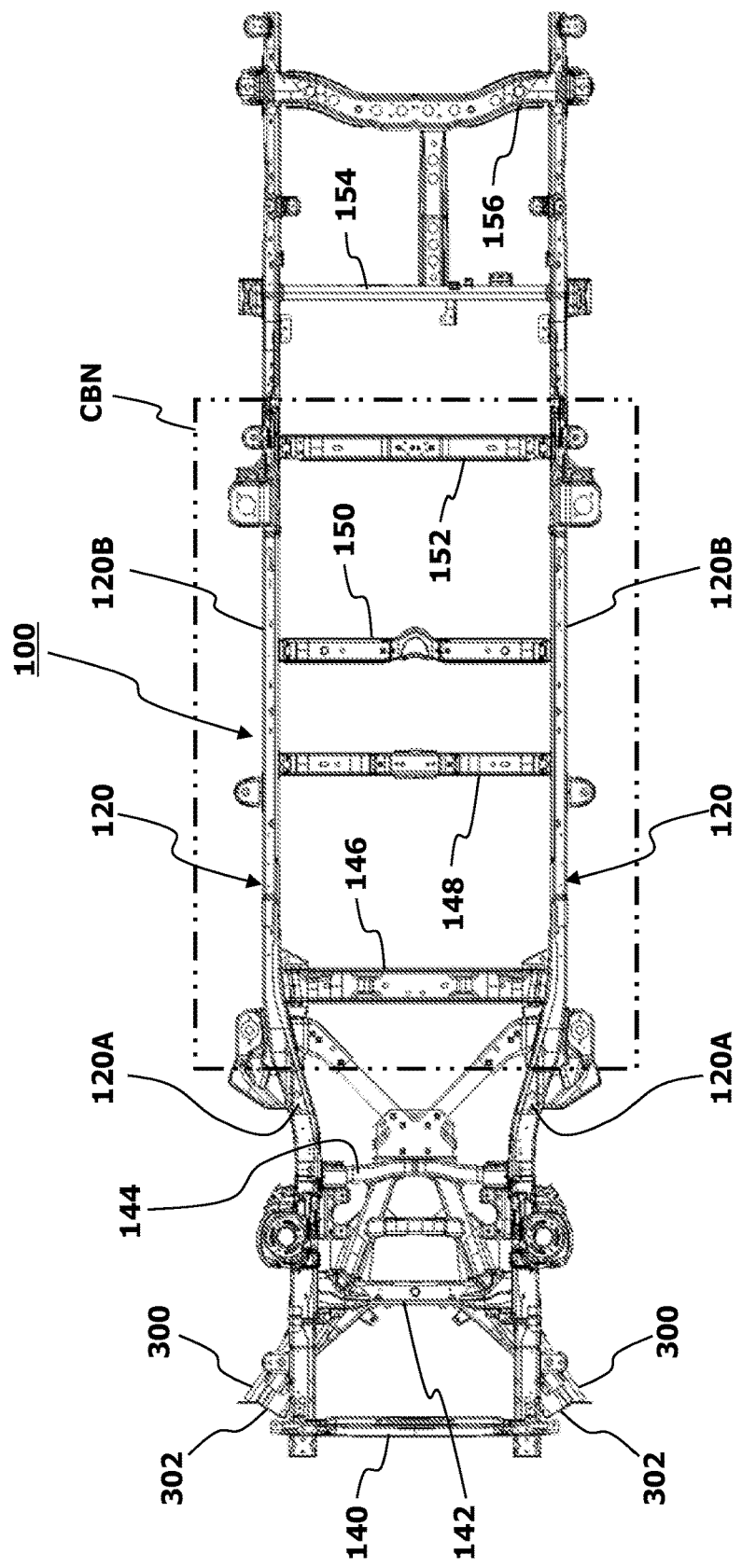
FIG. 2 is a plan view showing an example of a vehicle frame.

FIGS. 1 and 2 show an example of a vehicle frame for use in, e.g., a pickup truck.

A frame 100 includes a pair of right and left side frames 120 that extend substantially in parallel to the front-rear direction of the vehicle, and plural cross members 140, 142, 144, 146, 148, 150, 152, 154, and 156 that extend in the vehicle width direction to connect the pair of right and left side frames 120. The frame 100 constitutes the basic framework of the automobile structure. To the frame 100, an engine, a power transmission device, a suspension, etc. are attached. The cross members 140 to 156 of the frame 100 are named from the front to the back of the vehicle like the first cross member 140, . . . , and the ninth cross member 156. Note that the nine cross members 140 to 156 are provided here but any number of cross members can be provided.

The pair of right and left side frames 120 are made up of, e.g., a steel member having a channel shape (substantially U-shape) in cross section with one of the opposing surfaces being opened or having a box shape that is closed in cross section. The pair of right and left side frames 120 include a broadened portion 120A, the width of which increases from the front to the back of the vehicle. The pair of right and left side frames 120 also include a lowered portion 120B formed by lowering a portion between front and rear axles (where a cabin CBN is mounted) so as to allow a vehicle passenger easily get in/off the cabin CBN.

The cross members 140 to 156 serve to restrain torsion and parallelogrammic deformation of the frame 100 and also function as an attachment portion for various kinds of devices to be mounted on the vehicle. The cross members 140 to 156 are made up of a steel member having, e.g., a channel shape, an angle shape, a hat shape, and a box shape in cross section. The cross members 140 to 156 are connected to the side frames 120 by means of, e.g., brackets fixed to the side frames 120 or brackets fixed to both ends of the cross members 140 to 156. In this case, the side frames 120 and the cross members 140 to 156 are fixed by means of a fastening tool such as a bolt and a nut, and a rivet or through welding, etc. Intermediate portions of the second cross member 142 and the third cross member 144 are formed into substantially an arch shape that protrudes down to substantially the same height as the lowered portions 120B of the side frames 120 so as to lower the installation positions of the engine and a transmission. In this example, a reinforcing member such as a reinforcement or a cassette plate can be also attached to connecting points between the side frames 120 and the cross members 140 to 156 so as to enhance the connecting strength therebetween.

Figure 3:
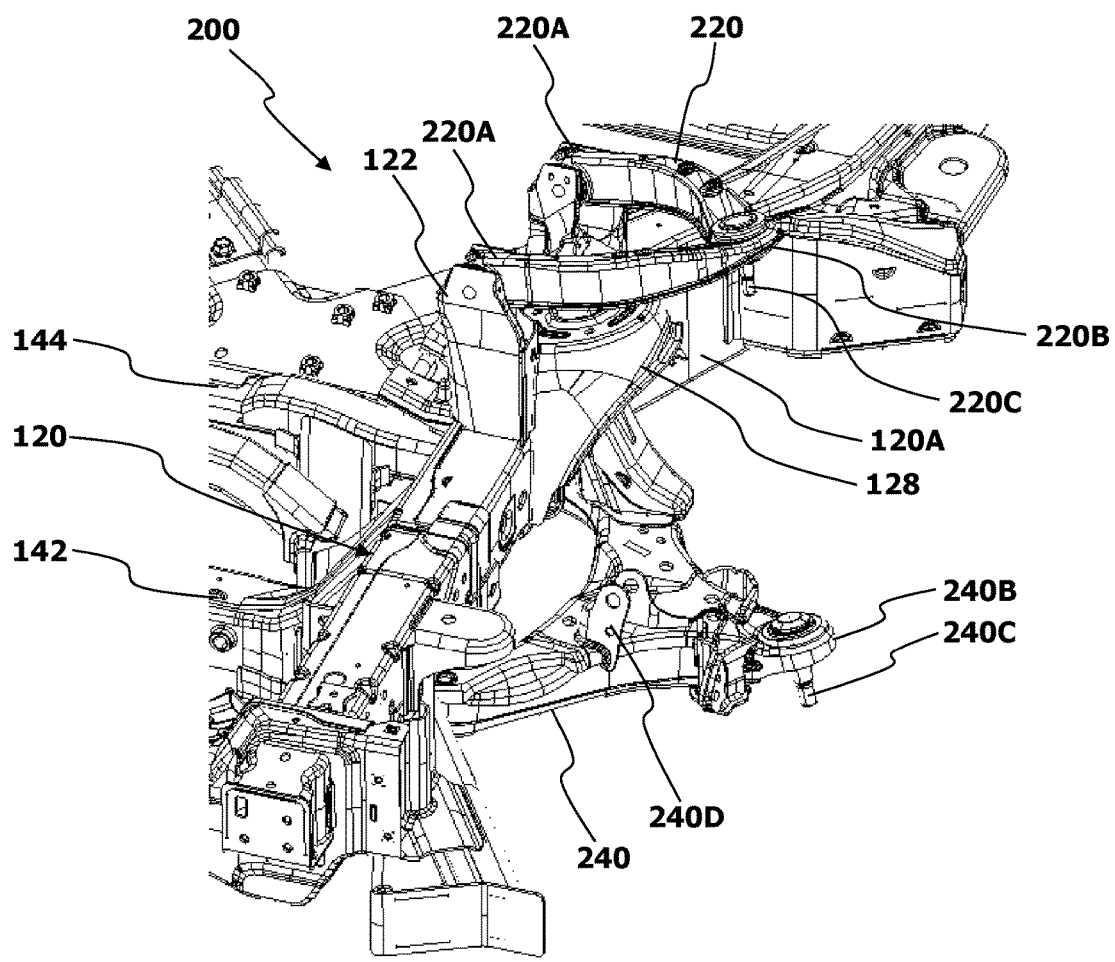
FIG. 3 is a perspective view of an example of a suspension as viewed from above.
Figure 4:
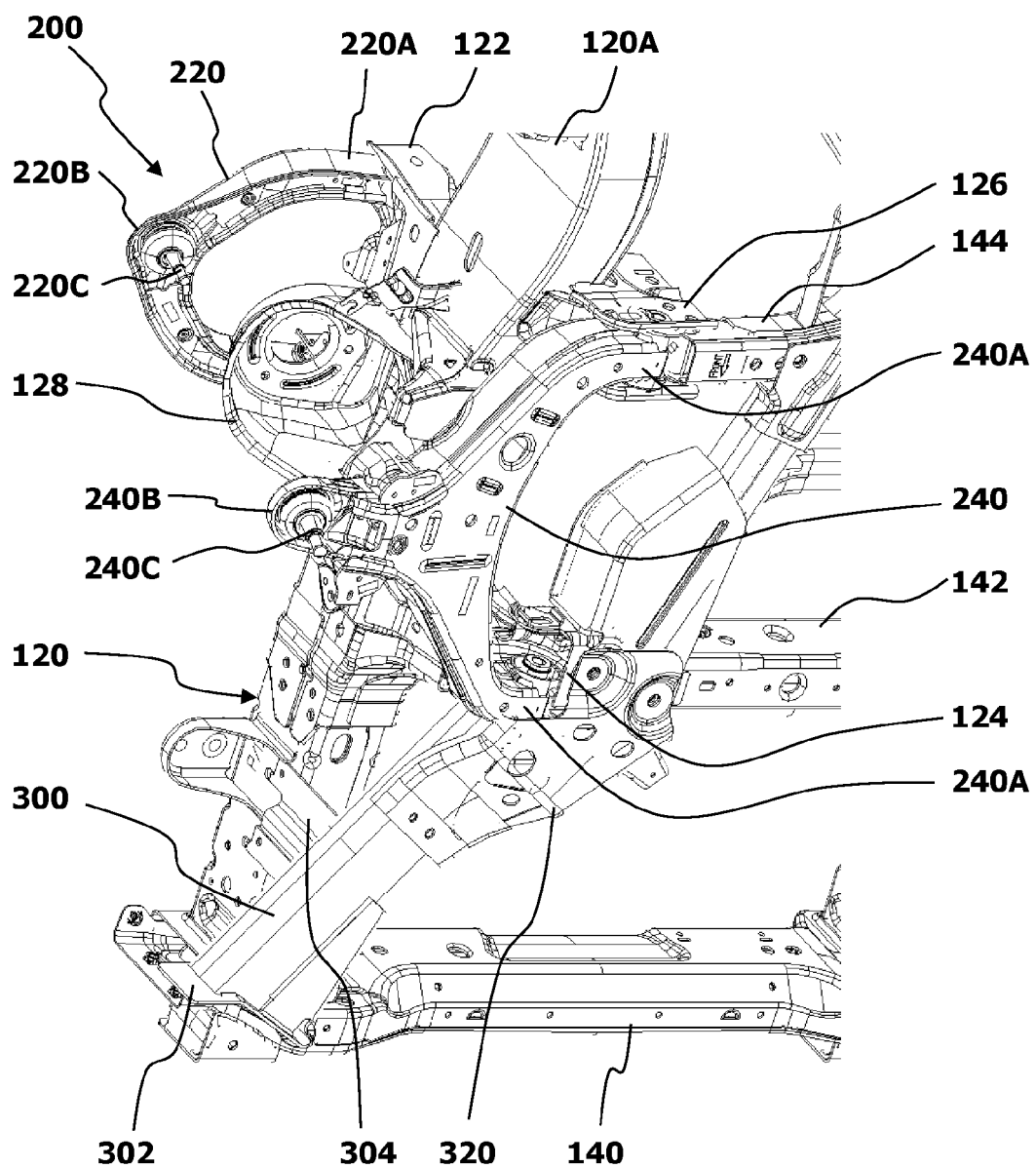
FIG. 4 is a perspective view of an example of a suspension as viewed from below.
Figure 5:
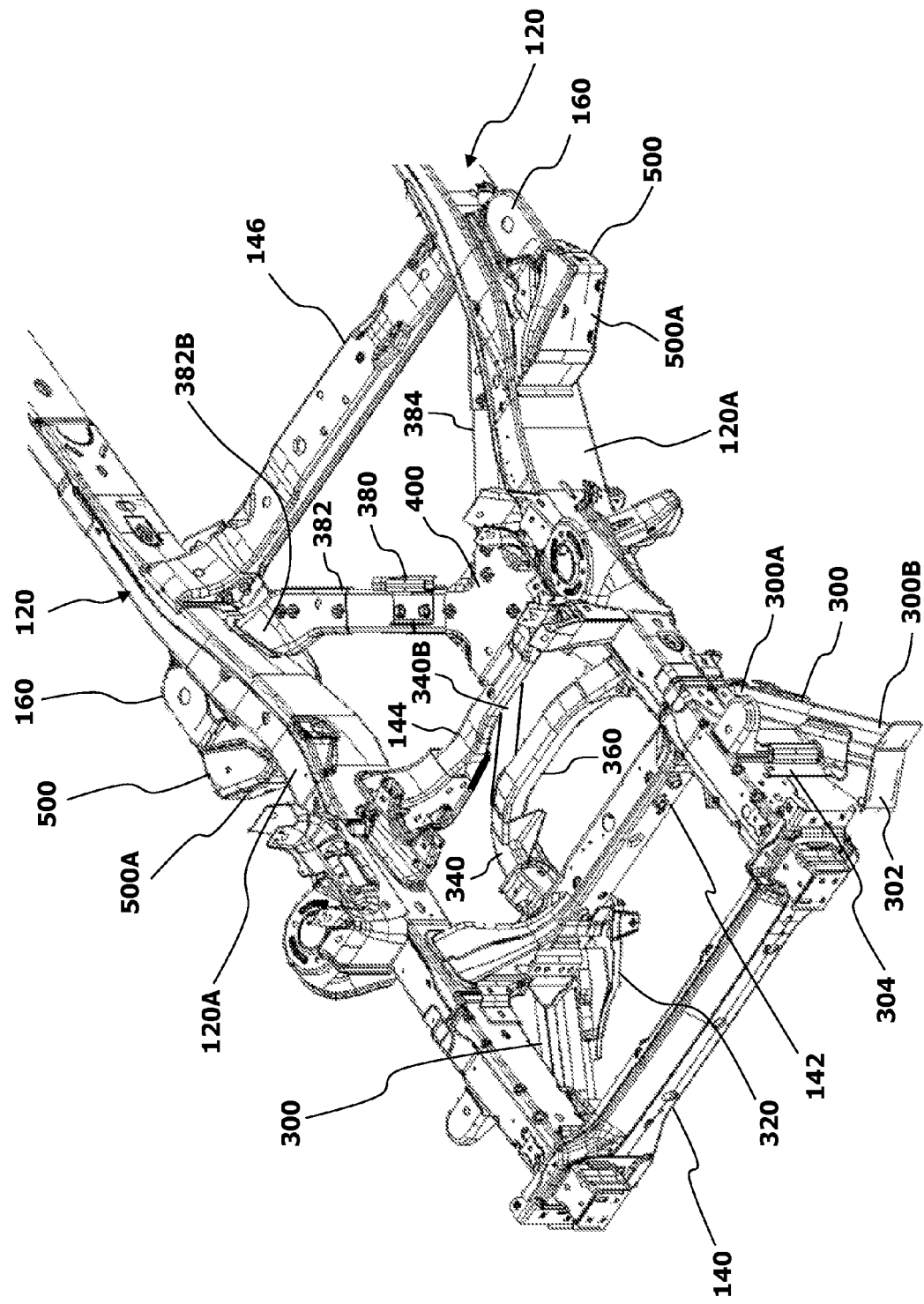
FIG. 5 is an enlarged perspective view showing main parts of a vehicle frame.
Figure 6:
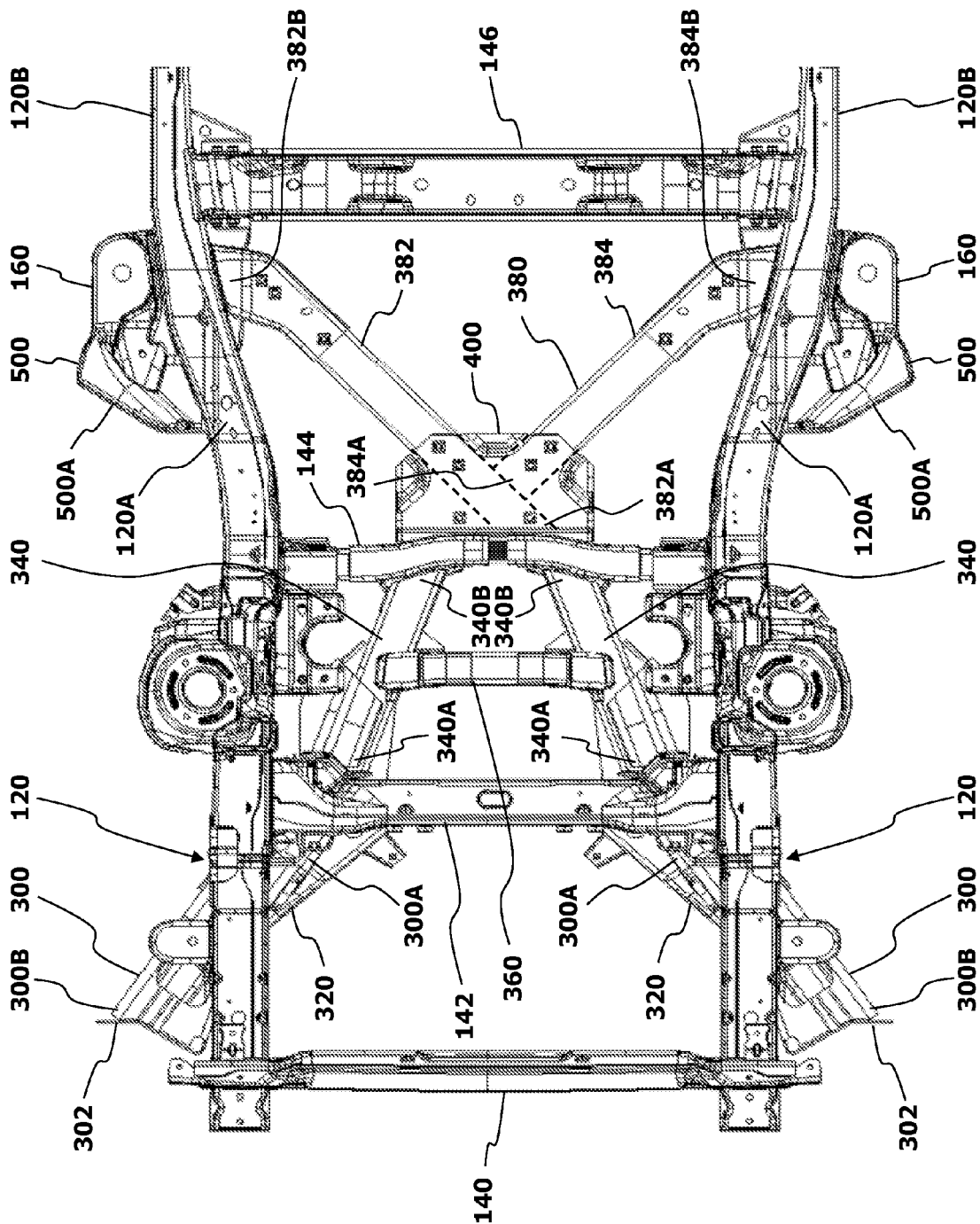
FIG. 6 is a plan view showing main parts of a vehicle frame.
Figure 7:
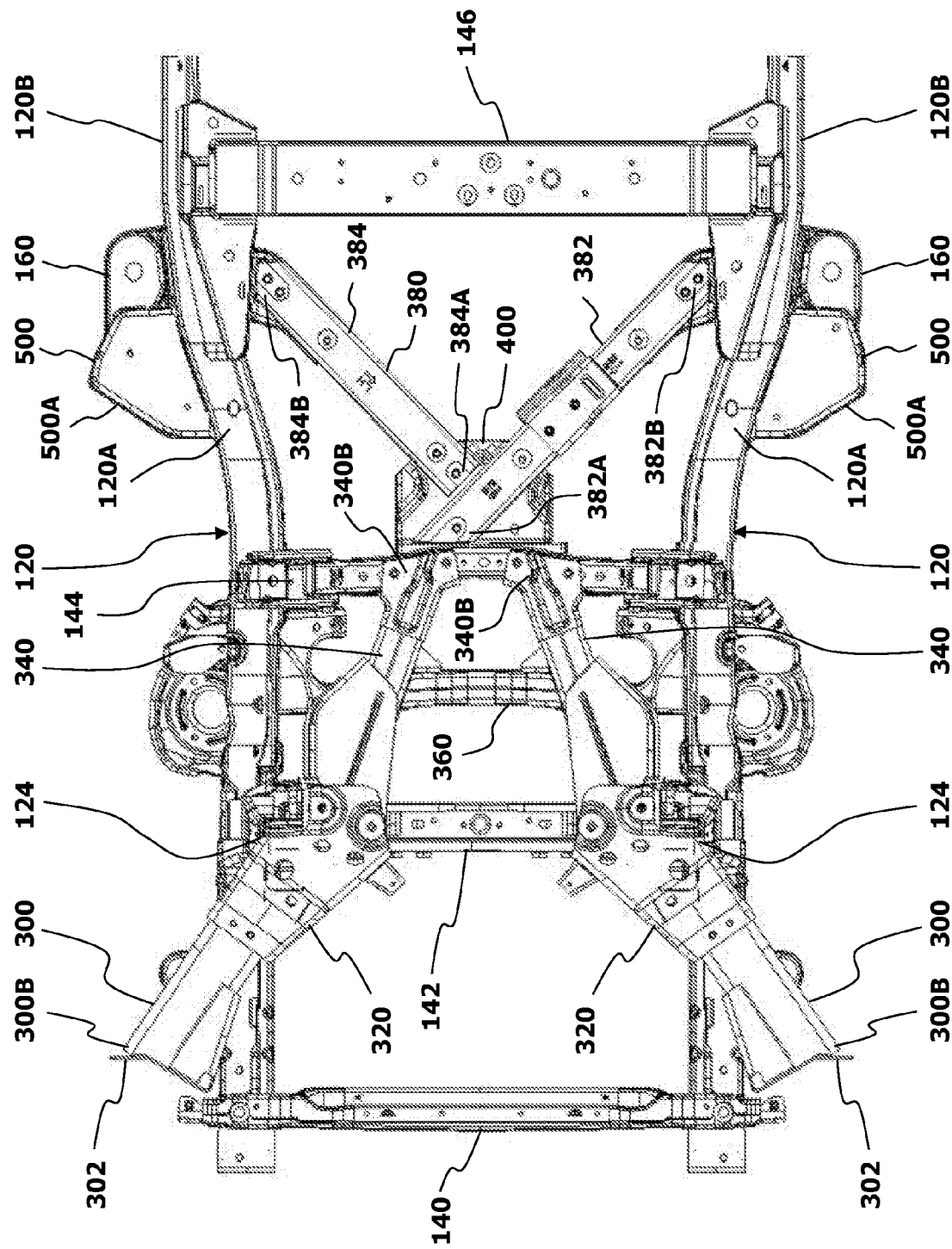
FIG. 7 is a bottom view showing main parts of a vehicle frame.

To a portion of the respective side frames 120 in front of the broadened portion 120A, i.e., the narrowed portion of the side frame 120, a double wishbone suspension (hereinafter abbreviated to "suspension") 200 is attached as shown in FIGS. 3 and 4. Note that the suspension 200 is not limited to the double wishbone suspension and can be any other well-known suspension such as a strut-type suspension.

The suspension 200 includes an upper arm 220, a lower arm 240, a steering knuckle (not shown), and a shock absorber (not shown) to which a coil spring is concentrically attached.

The upper arm 220 is made up of a steel member having substantially a V shape in plan view. Its proximal ends 220A are respectively attached oscillatably around the axis extending in the front-rear direction of the vehicle via, e.g., a bearing with respect to substantially a U-shaped upper bracket 122 fixed onto the respective side frames 120. The lower arm 240 is made up of a steel member having substantially a Y shape in plan view. Its proximal ends 240A are attached oscillatably around the axis extending in the front-rear direction of the vehicle via, e.g., a bearing with respect to lower brackets 124 and 126 fixed to the lower surfaces of the second cross member 142 and the third cross member 144, respectively. In this example, the lower brackets 124 and 126 are made up of a steel member having substantially a channel shape that is opened on its lower side as viewed from the outside in the vehicle width direction. The lower brackets 124 and 126 are fixed to the intermediate portions (projecting portions) of the second cross member 142 and the third cross member 144.

The steering knuckle is attached between a tip end 220B of the upper arm 220 and a tip end 240B of the lower arm 240 in the manner of being rotatable around king pins 220C and 240C extending in the vertical direction of the vehicle, via, e.g., a bearing. The shock absorber is attached, at its upper end, to the bracket 128 fixed to the outer surface of the side frame 120 and also attached, at its lower end, to the bracket 240D fixed to the upper surface of the lower arm 240. Also, a wheel disc (front wheel) integrated with a tire is attached to a knuckle spindle of a steering knuckle.

At the front surface of the second cross member 142 in front of the cabin CBN, i.e., at positions in front of the right and left lower brackets 124 and away therefrom with a predetermined distance, as shown in FIGS. 5 to 8, a pair of right and left push members 300 are respectively arranged, which are made up of a steel member having a box shape in cross section and extending from the above front surface toward the front of the vehicle as well as the outside in the vehicle width direction. More specifically, brackets 320 are fixed to the lower surfaces of the right and left ends of the second cross member 142. The brackets 320 are made up of a steel plate having substantially a rectangular shape in plan view and extending obliquely to the front of the vehicle. To the upper surfaces of the brackets 320, proximal ends 300A of the push members 300 are fixed. Tip ends 300B of the push members 300 extend up to the outside of the respective side frames 120 in the vehicle width direction and also the vicinity of the first cross member 140 so as to protrude up to the outside of the respective side frames 120 in the vehicle width direction. Here, the second cross member 142 is taken as an example of the one cross member.

At the tip ends 300B of the push members 300, receiving members 302 are fixed, which are made up of a steel plate having substantially a bent shape (substantially an angle shape) in plan view. An inner portion of the respective receiving members 302 in the vehicle width direction is positioned on the cross section of the respective push members 300 and an outer portion thereof in the vehicle width direction is positioned on a plane defined by the vehicle width direction and the vertical direction of the vehicle. Also, in order to ensure that the push members 300 can support the frame 100 with high strength, the intermediate portions of the push members 300 are supported to support plates 304 in the form of a steel plate fixed to the outer surfaces of the side frames 120. In this case, the support plates 304 can be fixed to the side frames 120 by means of, e.g., a fastening tool such as a bolt and a washer. Accordingly, the respective push members 300 are supported at two points with respect to the frame 100 and thus suffer from less oscillation from a running vehicle.

Figure 9:
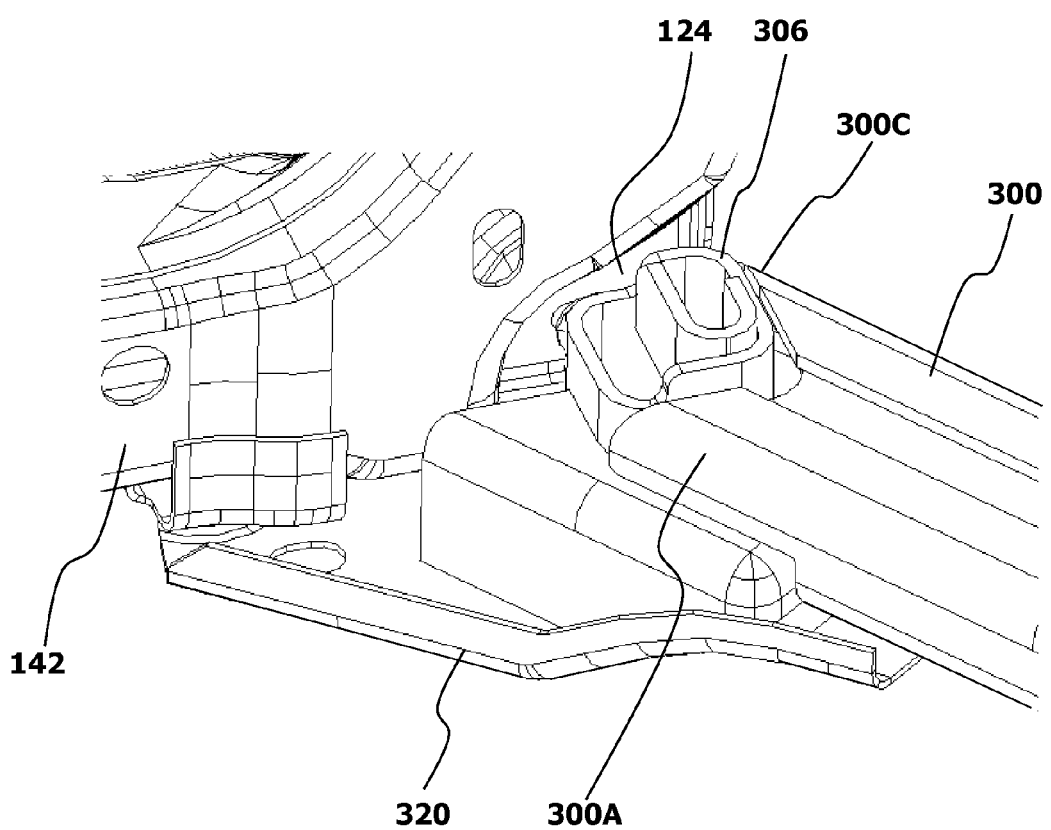
FIG. 9 is a perspective view showing a positional relationship of a push member to a cross member.
Figure 10:
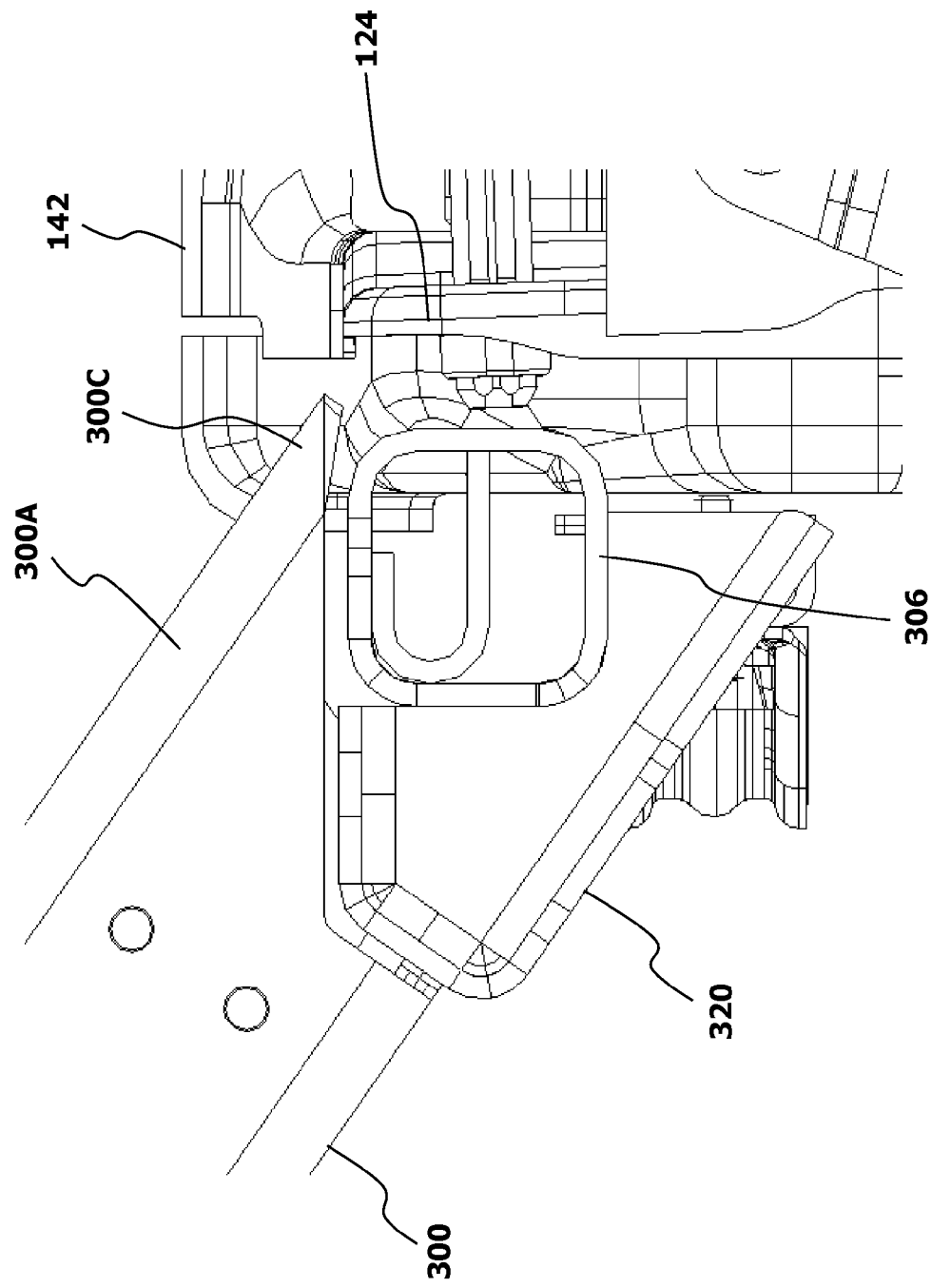
FIG. 10 is a bottom view showing a positional relationship of a push member to a cross member.

The end surfaces of the proximal ends 300A of the push members 300 are cut away along substantially L-shaped line that extends from a corner portion located at an outer portion in the vehicle width direction toward the front of the vehicle and further to an inner portion in the vehicle width direction as shown in FIGS. 9 and 10. Thus, the end portions of the push members 300, located at an outer portion in the vehicle width direction, have an acute angle portion (sharpened portion) 300C in plan view. By appropriately setting the dimension of the above notch, there is secured a space for fastening or loosening, by use of any tool, the fastening tools such as nuts for attaching the proximal ends 240A of the lower arm 240 to the lower brackets 124, whereby, for example, alignment for the suspension 200 can be adjusted. At the time of driving a vehicle, a spacer 306 is detachably inserted into the space between the respective push members 300 and the respective lower brackets 124 to thereby ensure enough strength for the proximal ends 300A of the push members 300.

One ends 340A of a pair of right and left first diagonal members 340 are attached to the second cross member 142, at the positions opposite to the push members 300 across the lower brackets 124. The one ends 340A obliquely extend from the above positions toward the back of the vehicle as well as the inner portion in the vehicle width direction. The first diagonal members 340 are made up of, e.g., a steel member having a box shape in cross section. The other ends 340B thereof are fixed to the front surface of the intermediate portion of the third cross member 144. In short, the first diagonal members 340 extend obliquely and backward from the position opposing the push members 300 across the second cross member 142 and serves to connect the second cross member 142 with the intermediate portion of the third cross member 144 behind the second cross member 142. In other words, the proximal ends 300A of the push members 300 are connected to the first diagonal members 340 across the lower brackets 124 for oscillatably fixing the proximal ends 240A of the lower arm 240 in the front of the vehicle. Here, the third cross member 144 is taken as an example of an other cross member.

The intermediate portions of the pair of right and left first diagonal members 340 are connected via a connecting member 360 made up of a steel member having a box shape in cross section and extending in the vehicle width direction. Thus, the second cross member 142 and the third cross member 144 are connected via substantially an H-shaped member including the pair of right and left first diagonal members 340 and the connecting member 360. The connecting member 360 protrudes upward at its intermediate portion and thus can support the engine and the transmission at its upper surface.

At the rear surface of the third cross member 144, i.e., at a position opposing the respective first diagonal members 340 across the third cross member 144, a second diagonal member 380 is provided, which is made up of a steel member having a box shape in cross section and extending from the above rear surface toward the back of the vehicle in the form of a V shape. In this example, the V shape is not limited to a completely symmetric V shape and has only to be the one that looks like a V shape.

More specifically, a bracket 400 is fixed to the upper surface of the central portion of the third cross member 144. The bracket 400 is made up of a steel plate having substantially a rectangular shape in plan view and extending from the above upper surface toward the back of the vehicle. One end 382A of a first member 382 is fixed to the lower surface of the bracket 400, at the position opposing the respective first diagonal members 340 across the third cross member 144. The first member 382 is made up of a steel member having a box shape in cross section. In this example, the end surface of the one end 382A of the first member 382 is in contact with the rear surface of the third cross member 144. The other end 382B of the first member 382 is fixed to the inner surface of the broadened portion 120A of the side frame 120 positioned on the right side of the vehicle, preferably, to the lowered portion 120B.

Moreover, at the lower surface of the bracket 400, one end 384A of a second member 384 is fixed, which is made up of a steel member having a box shape in cross section and obliquely extending from the one end 382A of the first member 382 toward the side frame 120 positioned on the left side of the vehicle. In this example, the second member 384 may be either apart from or in contact with the side surface of the first member 382. The other end 384B of the second member 384 is fixed to the inner surface of the broadened portion 120A of the side frame 120 positioned on the left side of the vehicle, preferably, to the lowered portion 120B. Note that the first member 382 and the second member 384 are arranged substantially symmetrically with respect to the right-left direction of the vehicle.

Figure 8:
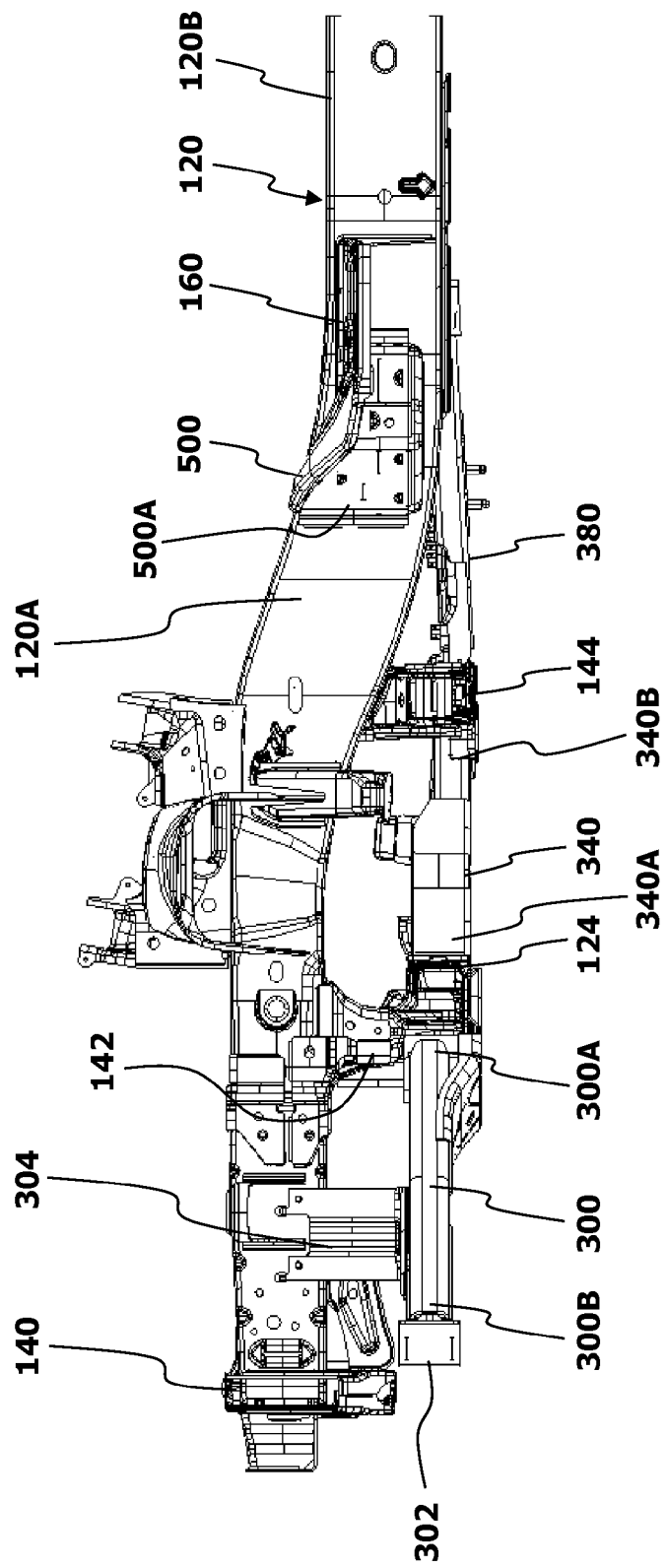
FIG. 8 is a side view showing main parts of a vehicle frame.

The push members 300, the first diagonal members 340, and the second diagonal member 380 can be arranged at substantially the same height as the lowered portion 120B of the side frame 120 as shown in FIG. 8. The same height is not limited to absolutely the same height and has only to be the one that looks like the same as the lowered portion.

Stoppers 500 are disposed to inhibit the front wheel from protruding into the cabin CBN in case of a vehicle crash, such that the stoppers 500 are partially positioned on the outer surface of the respective side frames 120, between the connecting points of the second diagonal member 380 to the side frames 120 and the fourth cross member 146 located behind the connecting points. The stoppers 500 protrude to the outside in the vehicle width direction from the outer surfaces of the side frames 120 and come into contact with the front wheel at the front surface positioned in the front of the vehicle. The front surfaces of the stoppers 500 respectively form a flat slope 500A extending from the front to the back of the vehicle obliquely toward the outside in the vehicle width direction so as to keep the front wheel away from the cabin CBN, e.g., in case of a vehicle crash. In this example, the stoppers 500 are integrated with mountings 160 for fixing the cabin CBN in order to reduce the total number of components in the vehicle. Note that the stoppers 500 can be provided separately of the mountings 160.

The stoppers 500 are made of a steel member having, e.g., substantially a cuboid shape, which opens only at a portion opposing the outer surface of the respective side frames 120 so as to ensure the strength enough to not cause large deformation in case of a vehicle crash. The stoppers 500 are fixed to a predetermined position on the outer surface of the respective side frames 120 through welding, etc. Being fixed to the outer surface of the respective side frames 120, the stoppers 500 achieve a box shape with a closed space. In order to further improve the strength of the stoppers 500, a reinforcing member such as a reinforcement can be also attached to at least one of its inner and outer surfaces.

The stoppers 500 can assume any shape or size that allows contact with the front wheel attached to the side frames 120 via the suspension 200 in case of a small overlap crash, etc.

Figure 11:
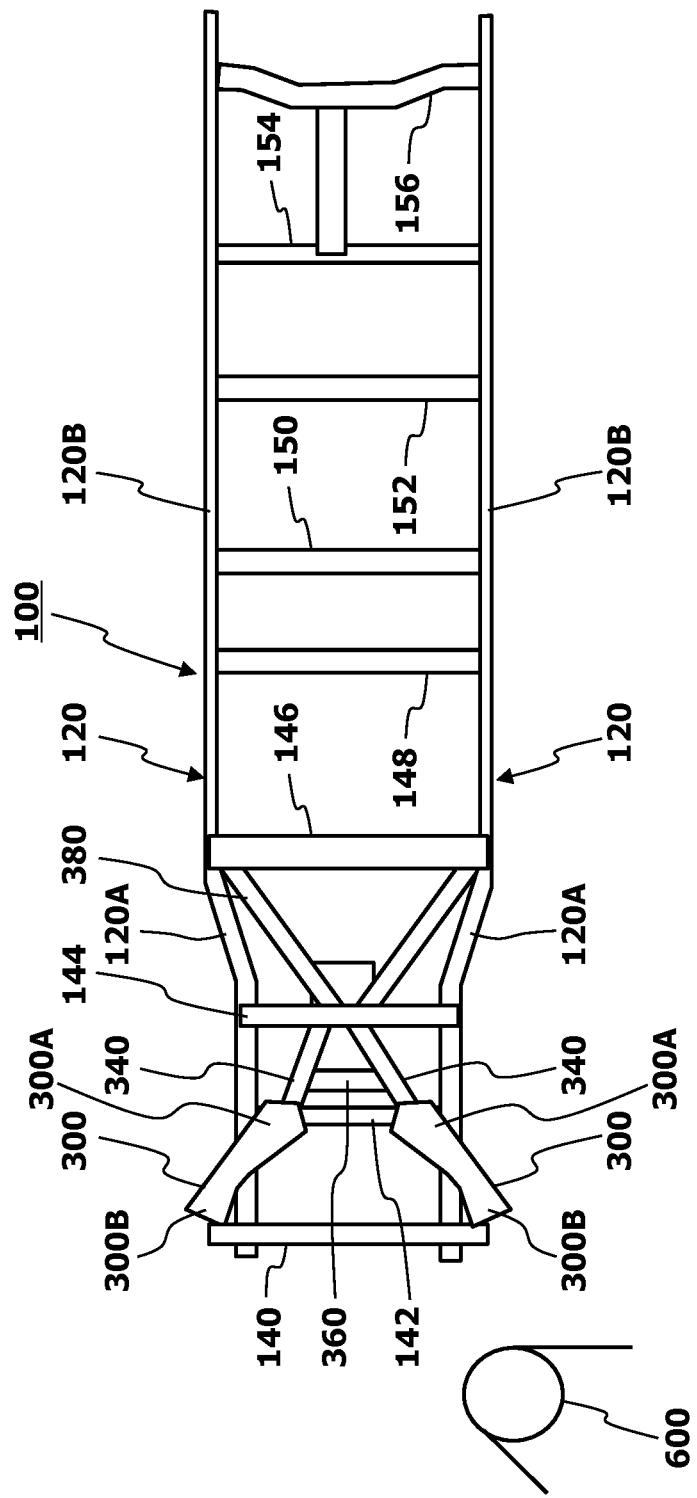
FIG. 11 is an explanatory view of a first process for moving a vehicle away from a barrier in case of a small overlap crash.

Next referring to FIGS. 11 to 14, described is the process in which the vehicle is moved away from a barrier in case of a small overlap crash against the barrier. In this example, it is assumed that, as shown in FIG. 11, the vehicle causes a small overlap crash against a barrier 600 on the left side in the travelling direction of the vehicle. Such situations may include, for example, the case that the left side (of a left-hand drive vehicle) where the driver's seat is located collides with an oncoming vehicle, when passing by, on a narrow street, etc.

Figure 12:
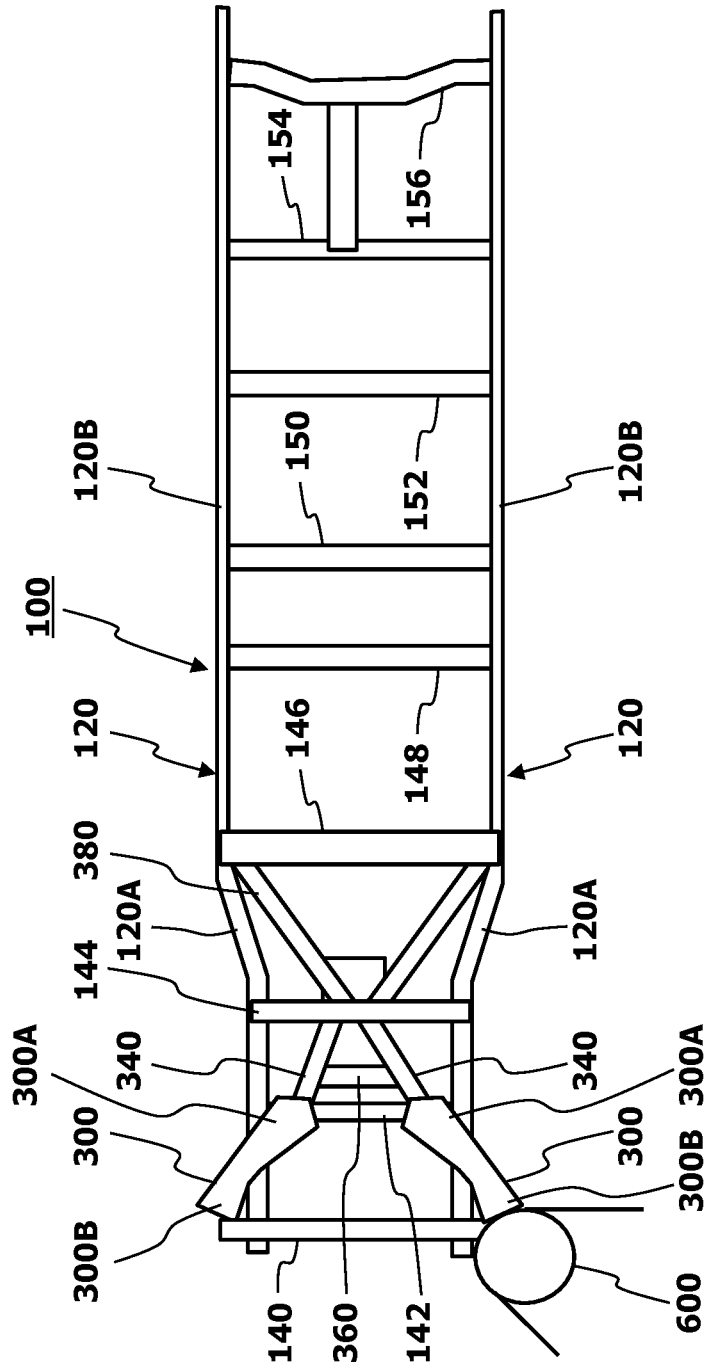
FIG. 12 is an explanatory view of a second process for moving a vehicle away from a barrier in case of a small overlap crash.

If the left side of the vehicle causes a small overlap crash against the barrier 600, the barrier 600 deforms a bumper, a front fender (not shown), etc. and then reaches and collides the tip end 300B of the push member 300 on the left side of the vehicle as shown in FIG. 12. When the barrier 600 collides the push member 300, crash force acts axially on the push member 300.

At this time, since a sharpened portion 300C (see FIGS. 9 and 10) is formed at the proximal end 300A of the push member 300, the sharpened portion 300C is stuck into the second cross member 142 and moves the push member 300 in the axial direction. Along with the movement of the push member 300 in the axial direction, the support plate 304 that supports the intermediate portion of the push member 300 to the side frame 120 is broken. Thus, the push member 300 becomes rotatable on the connecting portion with the second cross member 142 around the axis extending in the vertical direction of the vehicle.

When the push member 300 is stuck into the second cross member 142, the L-shaped portion comes into contact with the second cross member 142, and the crash force acting thereon is transmitted via the lower bracket 124 to the first diagonal member 340. At this time, since the intermediate portions of the pair of right and left first diagonal members 340 are connected by means of the connecting member 360, the first diagonal member 340 that has received the crash force is less deformed in the vehicle width direction.

Also, the crash force transmitted to the first diagonal member 340 is transmitted to the right and left side frames 120 via the second diagonal member 380 arranged across the third cross member 144. In short, the crash force acting on the push member 300 is dispersed throughout the frame 100 via a load path including the first diagonal members 340 and the second diagonal member 380. Hence, the frame 100 is less deformed, and the vehicle can be pushed sideways utilizing the crash force generated upon the collision between the push member 300 and the barrier 600.

At this time, if the push members 300, the first diagonal members 340, and the second diagonal member 380 are provided at the same height as the lowered portion 120B of the respective side frames 120 as shown in FIG. 8, the crash force acting on the push member 300 is linearly dispersed throughout the frame 100. Thus, the deformation of the frame 100 can be more restrained.

Figure 13:
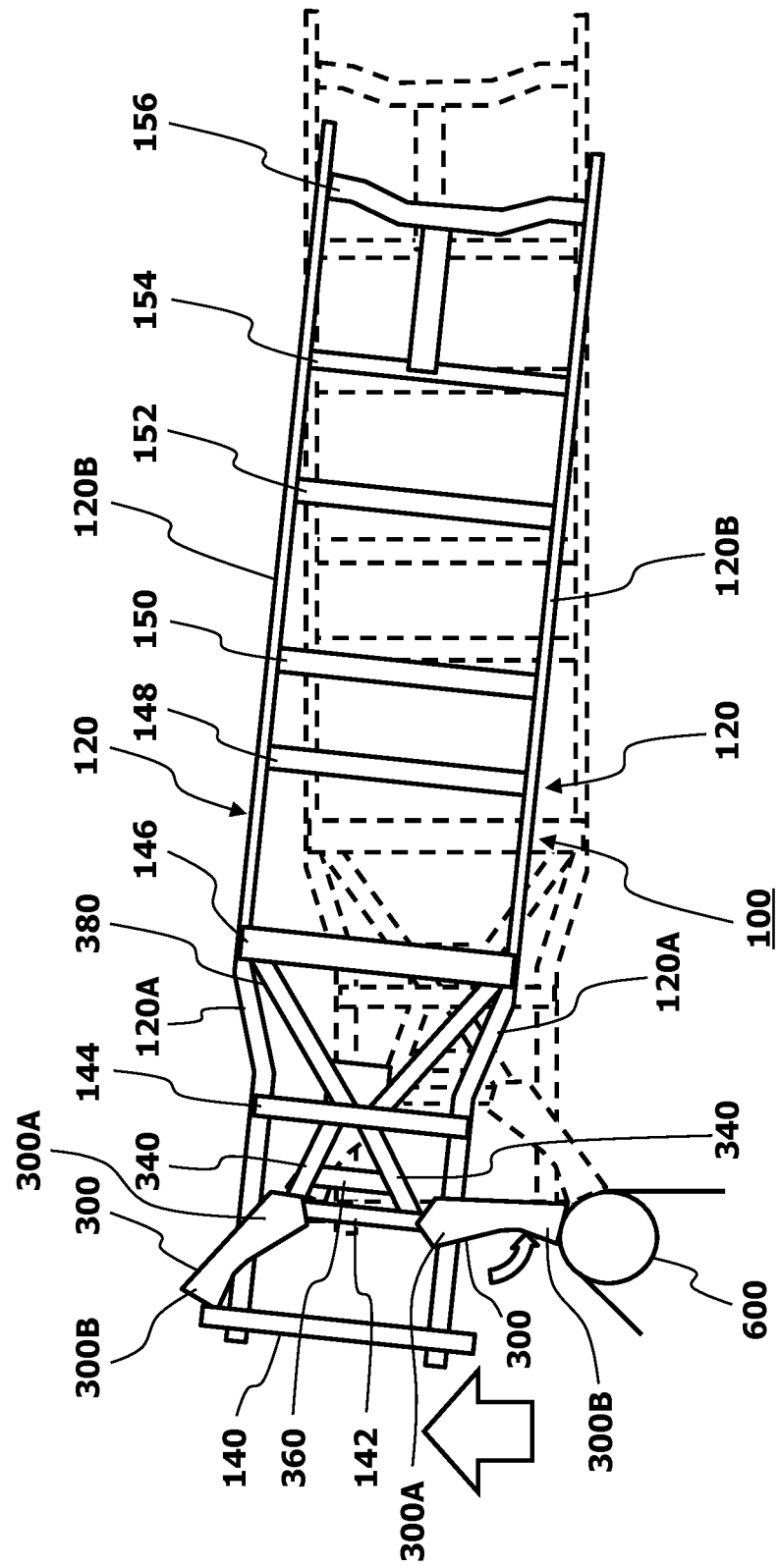
FIG. 13 is an explanatory view of a third process for moving a vehicle away from a barrier in case of a small overlap crash.

As the depth of collision of the vehicle against the barrier 600 increases, since the receiving member 302 is attached to the tip end 300B of the push member 300, the barrier 600 lets the push member 300 rotate in the direction illustrated in FIG. 13 while holding the barrier 600 at the receiving member. In other words, the inner portion of the receiving member 300 in the vehicle width direction forms a slope that slants obliquely and backward, toward the outside in the vehicle width direction, whereby the crash force generated upon collision with the barrier 600 partially increases along with the slope, and the increased force actively rotates the push member 300. Then, when the push member 300 is rotated on the proximal end 300A, the vehicle is pushed to move away from the barrier 600 in accordance with the rotational angle of the push member 300. Accordingly, the vehicle can be easily kept away from the barrier 600.

At the lower arm 240 of the suspension 200, the lower bracket 124 for oscillatably fixing the proximal end 240A positioned in the front of the vehicle is clamped between the push member 300 and the first diagonal member 340. Therefore, even if the barrier 600 collides with, e.g., the front wheel, the connecting portion between the lower bracket 124 and the proximal end 240A of the lower arm 240 in the front of the vehicle is hardly broken, whereby the front wheel can be moved to the back of the vehicle without rotating. When the front wheel moves to the back of the vehicle without rotating, it collides with the stopper 500 disposed on the back of the front wheel and is inhibited from protruding into the cabin CBN. In this case, the front surface of the stopper 500 forms the slope 500A, whereby the front wheel is moved away toward the outside in the vehicle width direction.

After that, when the push member 300 is rotated to some degree, as shown in FIG. 14, the barrier 600 is moved away from the receiving member 302 at the tip end 300A.

As described above, if the vehicle causes a small overlap crash against the barrier 600, the push member 300 that receives the crash force rotates on its proximal end 300A so as to keep the vehicle away from the barrier 600. At this time, the crash force acting on the push member 300 is dispersed to the side frames 120 through the first diagonal members 340 and the second diagonal member 380. Hence, the frame 100 is less deformed and the vehicle can be kept away from the barrier 600 utilizing the crash force generated upon collision with the barrier 600.

It should be noted that the entire contents of PCT/JP2016/071406, filed on Jul. 21, 2016, based on which convention priority is claimed herein, is incorporated herein by reference.

It should also be understood that many modifications and variations of the described embodiments of the invention will be apparent to a person having an ordinary skill in the art without departing from the spirit and scope of the present invention as claimed in the appended claims.

The invention claimed is:

1. A vehicle frame comprising:
 a pair of right and left side frames extending in a front-rear direction of a vehicle;
 a plurality of cross members extending in a vehicle width direction to connect the pair of right and left side frames;
 a pair of right and left push members which obliquely extend forward and also toward the outside in the vehicle width direction, from right and left ends of one of the cross members that is positioned in front of a cabin, and which have tip ends protruding up to the outside of the side frames in the vehicle width direction;
 a pair of right and left first diagonal members that obliquely extend backward from positions opposing the push members across the one cross member to connect the one cross member with an intermediate portion of another cross member positioned behind the one cross member; and
 a second diagonal member obliquely extending backward in a V shape from a position opposing the first diagonal members across the other cross member to connect the other cross member with inner surfaces of the right and left side frames, which are positioned behind the other cross member.

2. The vehicle frame according to claim 1, further comprising a connecting member extending in the vehicle width direction to connect intermediate portions of the pair of right and left first diagonal members.

3. The vehicle frame according to claim 1, wherein the side frames have lowered portions on which the cabin is mounted, and
 the push members, the first diagonal members, and the second diagonal member are disposed at the same height as the lowered portions of the side frames.

4. The vehicle frame according to claim 1, wherein a receiving member is fixed to a tip end of the respective push members such that an inner portion of the receiving member in the vehicle width direction is located on cross section of the respective push members, and an outer portion thereof in the vehicle width direction is located on a plane defined by the vehicle width direction and a vertical direction of the vehicle.

5. The vehicle frame according to claim 1, wherein a proximal end of the respective push members is connected to the respective first diagonal members across a lower bracket for oscillatably fixing a proximal end of a lower arm positioned in the front of the vehicle out of lower arms of a suspension.

6. The vehicle frame according to claim 5, wherein the proximal end of the respective push members is cut away into an L shape that extends forward from a corner portion positioned at an outer portion in the vehicle width and further extends to an inner portion in the vehicle width direction, and a spacer is detachably fixed to the L-shaped portion.

7. The vehicle frame according to claim 1, wherein an intermediate portion of the respective push members is supported by a support plate fixed to an outer surface of the respective side frames.

* * * * *